(12) United States Patent
Onodera et al.

(10) Patent No.: US 6,883,026 B1
(45) Date of Patent: Apr. 19, 2005

(54) METHOD AND APPARATUS FOR MANAGING LOCKS OF OBJECTS AND METHOD AND APPARATUS FOR UNLOCKING OBJECTS

(75) Inventors: Tamiya Onodera, Ageo (JP); Kiyokuni Kawachiya, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 09/378,549

(22) Filed: Aug. 20, 1999

(30) Foreign Application Priority Data

Aug. 31, 1998 (JP) .......................................... 10-244497

(51) Int. Cl.[7] .......................... G06F 9/46; G06F 17/30; G06F 15/173
(52) U.S. Cl. ............................ 709/223; 707/8; 718/104
(58) Field of Search .............................. 709/100, 102, 709/107, 223; 707/8, 1; 710/200

(56) References Cited

U.S. PATENT DOCUMENTS 6,112,222 A * 8/2000 Govindaraju et al. ....... 709/102
6,247,025 B1 * 6/2001 Bacon ........................ 707/102

FOREIGN PATENT DOCUMENTS

| JP | 58-169659 | 10/1983 |
| JP | 63-113637 | 5/1988 |
| JP | 63-129428 | 6/1988 |
| JP | 09-198265 | 7/1997 |

OTHER PUBLICATIONS

Technical Report of IEICE, CPSY92–85 (Mar. 1993) "Intra–Processor vs. Inter–Processor Synchronizations in Real–Time Multiprocessor Systems" by Hiroaki Takada and Ken Sakamura, pp. 41–48.

ACM Transactions on Computer Systems, vol. 9, No. 1, Feb. 1991, "Algorithms for Scalable Synchronization on Shared–Memory Multi–processors" by John M. Mellor–Crummey and Michael L. Scott, pp. 21–65.

Communications of the ACM, vol. 17, No. 10, Oct. 1974, "Monitors: An Operating System Structuring Concept" by C.A.R. Hoare, pp. 549–557.

Bacon, David F. et al, "Thin Locks: Featherweight Synchronization for Java," Proceedings of the ACM Conference on Programming Language Design and Implementation, vol. 33, No. 6, Jun. 1998, pp. 1–11.

IBM Appl. No. 08/937,311, "Locking and Unlocking Mechanism for Controlling Concurrent Access to Objects," filed Sep. 22, 1997.

* cited by examiner

*Primary Examiner*—William C. Vaughn, Jr.
*Assistant Examiner*—Joseph E. Avellino
(74) *Attorney, Agent, or Firm*—Roy W. Truelson; Leslie J. Payne

(57) ABSTRACT

A hybrid locking method for preventing a reduction in the processing speed of a frequently executed path which includes locking, accessing and unlocking an object is provided. According to the present invention, at least one contention bit is introduced. The contention bit, which is prepared separately from a lock field, is set when a contention occurs in a light-weight lock, and is cleared when a light-weight lock is shifted to a heavy-weight lock ("inflate" function). Specifically, if a lock of an object is managed by storing a bit representing a type of said lock, and an identifier of a thread having acquired a lock in accordance with a first type of lock or an identifier of a second type of lock into a storage area corresponding to the object, in a state where a plurality of threads exist, following steps are executed: if a first thread attempts to acquire a lock of an object that has been acquired by a second thread, determining whether the bit representing the type of the lock of the object represents the first type of lock; and if the bit represents the first type of lock, setting a contention bit.

14 Claims, 1 Drawing Sheet

METHOD AND APPARATUS FOR MANAGING LOCKS OF OBJECTS AND METHOD AND APPARATUS FOR UNLOCKING OBJECTS

FIELD OF THE INVENTION

The present invention relates to a technique for locking an object in a state where a plurality of threads exist.

BACKGROUND OF THE INVENTION

In order to synchronize the access to an object in a program that runs a plurality of threads, the program code is so designed that before an object is accessed it is locked, then it is accessed, and thereafter it is unlocked. A spin lock and a queue lock are well known as object locking methods. In addition, a combination of these locking methods (hereinafter, referred to as hybrid lock) has recently been proposed. Brief explanations for these object locking methods will now be given.

(1) Spin Lock

A spin lock system is a system wherein the identifier of a thread which acquires a lock of an object is stored in consonance with the object so as to manage the locking state. With the spin lock system, when thread T fails to acquire a lock of an object o, i.e., when another thread S has already locked the object o, thread T repeats the locking process until it acquires a lock. Specifically, an atomic machine instruction, such as compare_and_swap, is employed to lock or unlock an object in the following manner.

TABLE 1

| | |
|---|---|
| 10: | /* lock */ |
| 20: | while (compare_and_swap(&o->lock, 0, thread_id( ))==0) |
| 30: | yield( ); |
| 40: | /* access to o */ |
| | . . . |
| 50: | /* unlock */ |
| 60: | o->lock=0; |

Object locking is performed at lines 20 and 30. The function yield( ) is repeated until a lock is acquired. Here, yield( ) is used to halt the running of the current thread and to shift control to a scheduler. While normally a scheduler selects and runs one of several executable threads, in the long run, the scheduler runs the original thread and repeats the execution of the "while" loop until it has acquired a lock. When "yield" is present, not only are CPU resources wasted, but also the performance of the method must depend on a platform scheduling system, so that it is difficult to write a desirable program. At compare_and_swap in line 20, which is the condition provided for the "while" statement, the contents of the field "o->lock," which is prepared for object o, are compared with 0. If the result of the comparison is true, the ID of the thread (thread_id( )) is written to that field. Therefore, when 0 is stored in the field prepared for object o, it indicates that an object has not been locked by a thread. To unlock an object, as in line 60, 0 is stored in the field "o->lock". In this case, this field is, for example, one word, but the number of bits that is actually required is that which will suffice for the storage of an identifier of a thread.

(2) Queue Lock

A queue lock system is a locking system for employing a queue to manage a thread which accesses to an object. With the queue lock method, when thread T fails to lock an object o, thread T adds itself to the queue of the object o and suspends its execution. The code for unlocking an object includes a code that is used to examine a queue to determine whether it is empty. When the queue is not empty, one thread is extracted from the queue and its execution is resumed. This queue lock system is implemented together with the scheduling mechanism for an operating system (OS), and is provided as the API (Application Programming Interface) of the OS. For example, a semaphore or a Mutex variable constitutes a typical queue lock. In the queue lock system, the space overhead required exceeds one word, and normally is nearer twenty bytes. In addition, since a queue that is a common resource is operated internally by lock and unlock functions, this acquisition or the release of a specific lock should also be noted.

(3) Hybrid Lock

A multi-thread program is so written that access to a common resource should be protected by a lock, while taking into account the fact that the execution of the program will be performed by multiple threads. However, in some cases, multi-thread libraries are employed by single-thread programs, and even when the execution of a multi-thread program is performed by running multiple threads, a multi-thread contention of locks seldom occurs. Actually, according to the execution profile in a Java (trademark of Sun Microsystems Inc.) program, among many applications, contention of accesses to an object seldom occurs.

Therefore, it is considered that a very frequently executed path is one for "locking an unlocked object, accessing to it and unlocking it." But while this path is executed extremely efficiently in the spin lock system, it is less efficiently executed in the queue lock system, as to both time and space. On the other hand, when a contention actually occurs, even though this is seldom, CPU resources are wasted in the spin lock system, while such waste does not occur in the queue lock system.

According to the basic idea of the hybrid lock system, a simple lock system, such as that represented by a spin lock (hereinafter referred to as a light-weight lock), is combined with a complicated lock system, such as that represented by a queue lock (hereinafter referred to as a heavy-weight lock), so that the above frequently executed path is performed at a high speed, and the efficiency of the processing is maintained, even when a contention occurs. Specifically, the processing of a light-weight lock is performed first and, if a contention occurs, the operation is shifted to the processing of a heavy-weight lock, after this, only the processing of a heavy-weight lock is employed.

In the hybrid lock system, as well as in the spin lock system, a lock field is present in an object. A value of a "thread identifier," or of a "heavy-weight lock identifier," and a Boolean value indicating which value is stored are entered in the field.

The locking procedure is as follows.
1) Acquisition of a light-weight lock is attempted in accordance with an atomic instruction (e.g., compare_and_ swap). If the light-weight lock is acquired, an access to an object is executed. When the acquisition of a light-weight lock fails, it is assumed that a heavy-weight lock has already been acquired, or that although a light-weight lock is being used, the light-weight lock has already been acquired by another thread.
2) If the processing has already been shifted to the heavy-weight lock, the heavy-weight lock is acquired.
3) When contention occurs during the acquisition of the light-weight lock, first the light-weight lock is acquired and then the processing is shifted to the heavy-weight lock, which is acquired in turn (in the following explanation, the processing in 3) is executed during the "inflate" function).

There are two types of implementations of the hybrid lock, depending on whether or not a "yield" occurs upon the "acquisition of the light-weight lock." A detailed explanation for this will now be given. It should be noted that a lock field occupies a space whose size is a word. Further, to simplify the explanation, assume that the "thread identifier," or the "heavy-weight lock identifier," is in all cases an even number other than 0. When the least significant bit of the lock field is 0, the "thread identifier" value is stored in the field, and when the least significant bit is 1, the "heavy-weight lock identifier" value is stored.

HYBRID LOCK EXAMPLE 1

This example shows the processing employed for the hybrid locking that uses "yield" to acquire a light-weight lock. In accordance with the above described processing, the lock function can be written as follows:

TABLE 2

```
10:     void lock(o) {
20:         if (compare_and_swap (&o->lock, 0, thread_id( ))
30:             return;
40:         while (! (o->lock & FAT_LOCK)) {
50:             yield( );
60:             if (compare_and_swap (&o->lock, 0, thread_id( ))) {
70:                 inflate(o);
80:                 return;
90:             }
100:        }
110:        fat_lock(o->lock)
120:        return;
130:    }
150:    void unlock (o) {
160:        if (o->lock==thread_id( ))
170:            o->lock=0;
180:        else
190:            fat_unlock(o->lock);
200:    }
220:    void inflate(o) {
230:        o->lock=alloc_fat_lock( ) | FAT_LOCK;
240:        fat_lock(o->lock);
250:    }
```

In the pseudo-code shown in table 2, lines 10 to 130 represent the lock function; lines 150 to 200 represent the unlock function; and lines 220 to 250 represent the inflate function employed in the lock function. In the lock function, a light-weight lock of an object is attempted at line 20. If the object can be locked, the object is accessed. At the unlock of the object, since in line 160 a thread identifier is stored in the lock field of the object, 0 is stored in the field in line 170. The most frequently executed path can be executed as fast as it is in the spin lock. When in line 20 the lock of the object can not be acquired, the FAT_LOCK bit, which is the least significant bit of the lock field, and each bit in the lock field are ANDed, which is the condition of the "while" statement in line 40, and it is checked whether the obtained result is "0," i.e, whether FAT_LOCK is 0 (more specifically whether the lock is a light-weight lock). If this condition is satisfied, "yield" is performed until the light-weight lock is acquired at line 60. After the light-weight lock is acquired, the "inflate" function beginning at line 220 is performed. In the "inflate" function, the heavy-weight lock identifier and the FAT_LOCK bit, which has a Boolean value of 1, are entered in lock field "o->lock" (line 230). Then, the heavy-weight lock is acquired (line 240). If the value of the FAT_LOCK bit on line 40 is 1, the heavy-weight lock is immediately attempted to acquire (line 110). On line 190 the heavy-weight lock is unlocked. However, since the acquisition and the release of the heavy-weight lock are not closely related to the present invention, no explanation for them will be given.

It should be noted that the lock field in table 2 must be rewritten only by a thread that holds a light-weight lock. The same discipline can be applied for the unlocking process. The occurrence of "yield" is limited to such a time as a contention occurs in a light-weight lock.

HYBRID LOCK EXAMPLE 2

An example hybrid lock will be described where "yield" is not performed to acquire a light-weight lock. In this example a thread waits when a contention occurs in a light-weight lock, and at the release of the light-weight lock, the waiting thread is notified of this occurrence. For the waiting and the notification, a condition variable, a monitor, or a semaphore is required. In the following example a monitor is employed.

TABLE 3

```
10:     void lock(o) {
20:         if (compare_and_swap (&o->lock, 0, thread_id( )))
30:             return;
40:         monitor_enter(o);
50:         while (! (o->lock, & FAT_LOCK)) {
60:             if (compare_and_swap (&o->lock, 0, thread_id( ))) {
70:                 inflate(o);
80:                 monitor_exit(o);
90:                 return;
100:            } else
110:                monitor_wait(o);
120:        }
130:        monitor_exit(o);
140:        fat_lock(o->lock);
150:        return;
160:    }
180:    void unlock (o) {
190:        if (o->lock==thread_id( )) {
200:            o->lock=0;
210:            monitor_enter(o);
220:            monitor_notify(o);
230:            monitor_exit(o);
240:        } else
250:            fat_unlock(o->lock);
260:    }
280:    void inflate(o) {
290:        o->lock=alloc_fat_lock( ) | FAT_LOCK;
300:        fat_lock(o->lock);
310:        monitor_notify_all(o);
320:    }
```

The monitor is a synchronization mechanism devised by Hoare, in which mutual exclusion is provided ("enter" and "exit") for an access to an object, that performs a thread waiting operation ("wait") and a thread notification operation ("notify" and "notify_all") when a predetermined condition has been established (see "C.A.R. Monitors: An Operating System Structuring Concept," Hoare, Communications of ACM 17, 10 Oct. 1974, pp. 549 to 557). Only one thread at a time is permitted to enter the monitor. If thread S has preceded thread T and has already entered monitor m, thread T must wait at least until thread S has exited monitor m, i.e., mutual exclusion is provided. Thread T, once it is entered in monitor m, can then remain there until a certain condition has been established. Specifically, thread T implicitly exits from monitor m and suspends. It should be noted that when thread T implicitly exits from monitor m another thread can enter. On the other hand, when thread S has entered monitor m, it can notify monitor m after a certain condition has been established. Specifically, that a thread U that waits to enter the monitor m has been awakened. Then, the execution of thread U can be resumed so that it can enter monitor m. It should be noted, however, that since at that time thread S has entered monitor m, thread U must wait until thread S has exited from monitor m. When there are no threads waiting on monitor m, nothing occurs. The operation initiated by "notify_all" is the same as that initiated by "notify," except that all the threads waiting on the monitor are awakened.

In table 3 lines 10 to 160 represent the lock function; lines 180 to 260 represent the unlock function; and lines 280 to 320 represent the "inflate" function. Differences between the lock function in table 3 and that in the hybrid lock example 1 are: entering the monitor (line 40); waiting performed without a "yield" when a contention occurs at a light-weight lock (line 110); and exiting from the monitor when the locking processing is shifted to a heavy-weight lock (line 80) and when it is confirmed that the processing has been shifted to a heavy-weight lock (line 130). It should be noted that at line 130 the thread exits from the monitor and at line 140 the heavy-weight lock is acquired.

A point in the unlock function that differs from that in hybrid lock example 1 is a part constituted by lines 210 to 230, for entering the monitor, notifying the monitor and exiting from the monitor. This is because instead of performing "yield," the thread waits on the monitor. In addition, "notify_all" is also added to the inflate function because threads may wait on the monitor, instead of performing "yield." It should be noted that in line 290 the OR operation is performed for a heavy-weight lock identifier, which is obtained at alloc_fat_lock( ), and FAT_LOCK bit, which has a Boolean value of 1, and the result is stored in the lock field.

As apparent from table 3, "yield" is removed, but "notify" is added because a waiting thread may be present during the unlocking process, so that the performance of a frequently executed path is deteriorated. For spatial efficiency, the monitor or an equivalent function is additionally required, but will be rendered unnecessary after the locking process has been shifted to the heavy-weight lock. In other words, the monitor and the heavy-weight lock must be prepared separately.

HYBRID LOCK EXAMPLE 3

In this example, unlike in example 1, a heavy-weight lock and monitor are not independently prepared, and the FAT_LOCK bit represents a shift to the heavy-weight lock. When a thread has entered the monitor, it is assumed that a heavy-weight lock has been acquired. See, for example, "Thin Locks: Featherweight Synchronization For Java," David F. Bacon, Ravi Konuru, Chet Murthy and Mauricio Serrano, Proceedings of SIGPLAN '98 Conference on Programming Language Design And Implementation (1998), pp. 258 to 268. It should be noted that in this paper "yield" is performed.

SUMMARY OF THE INVENTION

It is one object of the present invention to provide a new hybrid locking method whereby the processing speed of a frequently executed path is not deteriorated.

It is another object of the present invention to provide an object locking method whereby a heavy-weight lock and a monitor need not be separately prepared and "yield" is not employed, and whereby when the FAT_LOCK bit indicates a shift to a heavy-weight lock and that a monitor has been entered, it is assumed that a heavy-weight lock has been acquired.

Since in the above described hybrid lock system no consideration is given to shifting from a heavy-weight lock to a light-weight lock, it is an additional object of the present invention to enable a shift from a heavy-weight lock to a light-weight lock.

According to the present invention, at least one contention bit is introduced in order to prevent a reduction in the processing speed of a frequently executed path. The contention bit, which is prepared separately from a lock field, is set when a contention occurs in a light-weight lock, and is cleared when a light-weight lock is shifted to a heavy-weight lock ("inflate" function is executed).

Specifically, if a lock of an object is managed by storing a bit representing a type of said lock, and an identifier of a thread having acquired a lock in accordance with a first type of lock or an identifier of a second type of lock into a storage area corresponding to the object, in a state where a plurality of threads exist, following steps are executed: if a first thread attempts to acquire a lock of an object that has been acquired by a second thread, determining whether the bit representing the type of the lock of the object represents the first type of lock; and if the bit represents the first type of lock, setting a contention bit.

By doing so, when a second thread releases a lock of an object, it is possible to execute following steps: determining whether the bit representing the type of the lock represents the first type of lock; if the bit represents the first type of lock, storing in the storage area, data that no thread holds the lock of the object; determining whether the contention bit has been set; and if the contention bit has not been set, terminating unlocking processing and performing no further processing. That is, the reduction in the performance of the frequently executed path is limited only to a check of whether or not the contention bit has been set.

On the other hand, if the contention bit has been set, following steps may be executed: shifting the second thread into an exclusive state of a mechanism for providing an exclusion of an access to an object and a wait-operation of a thread and a notify-operation to a waiting thread in a case where a predetermined condition is satisfied; performing the notify-operation to the waiting thread; and removing the first thread from the exclusive state.

The first type of lock may be a locking method for managing a lock state by storing for an object, an identifier of a thread which holds a lock so as to correspond to the object. The second type of lock may be a locking method for employing a queue to manage a thread that accesses to an object.

In addition, in order to make it possible that a heavy-weight lock and a monitor do not need to be prepared separately, and that if a FAT_LOCK bit indicates a shift to a heavy-weight lock and a thread enters a monitor, it is assumed that a heavy-weight lock has been obtained, if a lock of an object is managed by storing a bit representing a type of the lock, and an identifier of a thread having acquired a lock in accordance with a first type of lock or an identifier of a second type of lock into a storage area corresponding to the object, in a state where a plurality of threads exist, wherein the second type of lock is a locking method for employing a queue to manage a thread that accesses to an object, following steps are executed: shifting the second thread into an exclusive state of a mechanism for providing an exclusion of an access to an object and a wait-operation of a thread and a notify-operation to a waiting thread in a case where a predetermined condition is satisfied; determining whether the bit representing the type of the lock of a certain object represents the first type of lock; if the bit represents the first type of lock, determining whether the first thread can acquire the first type of lock; and if the first thread can acquire the first type of lock, storing in a storage area corresponding to the certain object, the bit representing the second type of lock and the identifier of the second type of lock. The first thread exits from the exclusive state upon the completion of operations required for the certain object.

If the first thread can not acquire the first type of lock, a step of shifting to a wait state of the mechanism may be executed. If the bit representing the type of the lock of the certain object does not represent the first type of lock, a step of assuming that the first thread has acquired the second type of lock and performing processing without exiting from the exclusive state may be executed.

Furthermore, to achieve the above object, following steps are executed: shifting a first thread to an exclusive state of a mechanism for providing an exclusion of an access to an object and a wait-operation of a thread and a notify-operation to a waiting thread in a case where a predetermined condition is satisfied; determining whether the bit representing the type of the lock of a certain object represents the second type of lock; and if the bit represents the second type of lock, assuming that the first thread has acquired the second type of lock and performing processing without exiting from the exclusive state. When a thread is shifted to a heavy-weight lock, the thread enters the monitor so that the processing can be performed while assuming that the heavy-weight lock has been acquired.

In order to make it possible to shift from the heavy-weight lock to the light-weight lock, if a lock is managed by storing a bit representing a type of the lock, and an identifier of a thread having acquired a lock in accordance with a first type of lock or an identifier of a second type of lock into a storage area corresponding to the object, in a state where a plurality of threads exist, wherein the second type of lock is a locking method for employing a queue to manage a thread that accesses to an object, following steps are executed to unlock a lock of an object: determining whether a lock of a certain object which has been acquired by a first thread is the second type of lock; if the lock of the certain object is the second type of lock, determining whether there is a thread in a waiting state of a mechanism for providing an exclusion of an access to an object and a wait-operation of a thread and a notify-operation to a waiting thread in a case where a predetermined condition is satisfied; if there is no waiting thread, storing in said storage area data that no thread holds the lock.

The above described processing can be implemented by a dedicated apparatus, or by a computer program. Further, such a computer program can be stored on a storage medium, such as a CD-ROM, a floppy disk or an MO (Magneto-optic) disk, or on a storage device such as a hard disk.

DETAILED DESCRIPTION OF THE PREFERRED EMBODIMENT

Figure 1:
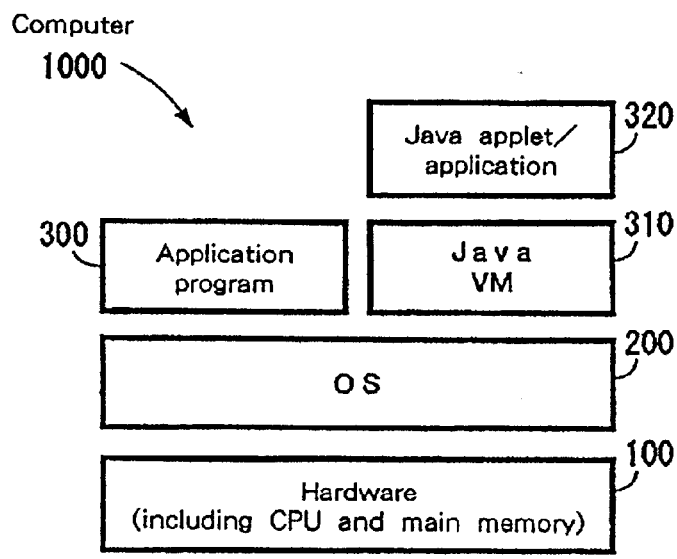
FIG. 1 is a diagram illustrating an example computer that performs the processing of the present invention.

An example computer that performs the processing of the present invention is shown in FIG. 1. A computer 1000 comprises a hardware section 100 which includes a CPU (can be one or more) and a main memory, an OS (Operating System) 200, and an application program 300. The OS 200 enables a plurality of threads operating as the application program 300. The OS 200 also provides a function required for queue locking. The application program 300 includes a monitor function and the locking and unlocking functions of the present invention. To handle the Java language, a Java VM (Virtual Machine) 310 is located above the OS 200, and an applet or an application 320 may be executed by it. The applet or the application 320 may be executed as multiple threads. In the Java language, the monitor function and the locking and unlocking functions of the present invention are implemented in the Java VM 310. The Java VM 310 may be installed as a part of the OS 200. The computer 1000 may be a so-called network computer that does not have a sub-storage device.

Figure 2:
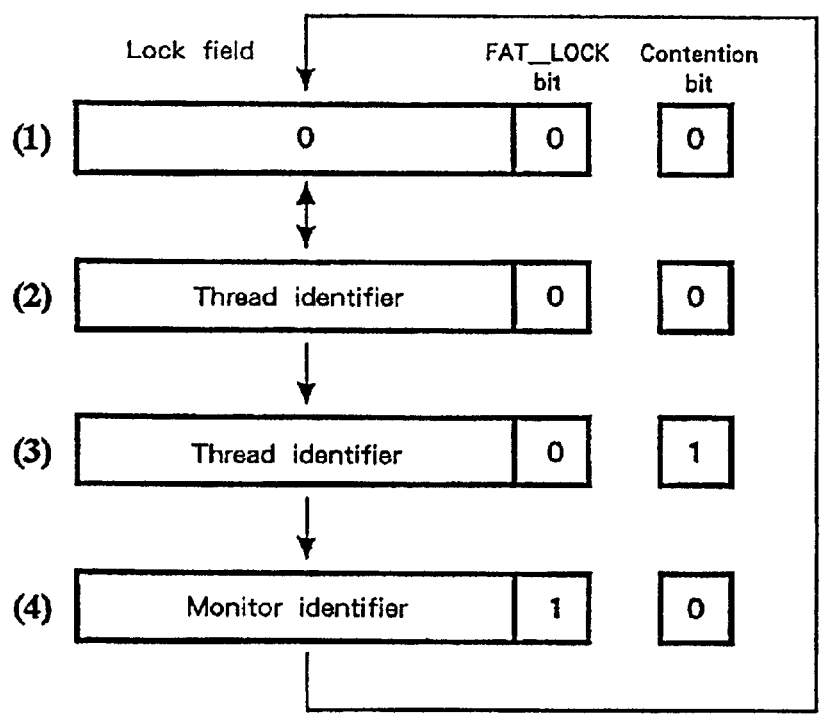
FIG. 2 is a diagram for explaining the shifting of modes and the states of a lock field (including a FAT_LOCK bit) and of a contention bit, with (1) showing the condition when there is no lock, (2) showing the condition when there is a light-weight lock with no contention, (3) showing the condition when there is a light-weight lock with a contention, and (4) showing the state for a heavy-weight lock.

Before explaining the processing in the present invention, a contention bit is newly introduced in order to prevent a reduction in the processing speed of a frequently executed path. When, as shown in FIG. 2, no thread locks a specific object (state (1)), a value of "0" is stored in a contention bit and in a lock field. Following this, after a specific thread has locked that object (a light-weight lock), the identifier of the thread is stored in the lock field (state (2)). If another thread does not attempt to lock the object before the specific thread has unlocked it, the processing is returned to state (1). However, if another thread attempts to lock the object before the specific thread has unlocked it, a contention occurs among the light-weight locks and a contention bit is set to record this contention (state (3)). Following this, when the light-weight lock is shifted to a heavy-weight lock, the contention bit is cleared (state (4)), and, if possible, state (4) is shifted to state (1). In the lock field, a bit (FAT_LOCK) representing a mode for a light-weight lock or a heavy-weight lock is positioned as the least significant bit. This bit may instead be positioned as the most significant bit.

The processing performed by the present invention using the contention bit and the lock field is shown below.

TABLE 4

```
10:  void lock (Object*o) {
20:    /* light-weight lock */
30:    if (compare_and_swap (&o->lock, 0, thread-id( )))
40:      return;
50:    /* heavy-weight lock and mode shift path */
60:    MonitorId mon=obtain_monitor(o);
70:    monitor_enter(mon);
80:    /* mode shift loop */
90:    while (o->lock & FAT_LOCK) ==0) {
100:     set_flc_bit(o);
110:     if (compare_and_swap (&o->lock, 0, thread_id( )))
120:       inflate(o, mon);
130:     else
140:       monitor_wait (mon);
150:   }
160:
170: }
180:
190: void unlock (Object*o) {
200:   /* light-weight lock path */
210:   if ((o->lock & FAT_LOCK) ==0)
220:     o->lock=0;
230:     if (test_flc_bit(o)){ /* overhead of the present   invention */
240:       MonitorId mon=obtain_monitor(o);
250:       monitor_enter(mon);
260:       if (test_flc_bit(o))
270:         monitor_notify(mon);
280:       monitor_exit(mon);
290:     }
```

TABLE 4-continued

```
300:      return
310:   }
320:   /* heavy-weight lock path */
330:   x=o->lock
340:   if (there is no thread waiting for object o at the   monitor)
350:      if (a predetermined condition is satisfied)
360:         o->lock=0; /* shift from heavy-weight lock to   light-
             weight lock */
370:   monitor_exit(x&¯FAT_LOCK);
380: }
390:
400:
410: void inflate (Object* o, MonitorId mon) {
420:    clear_flc_bit(o);
430:    monitor_notify_all (mon);
440:    o->lock= (Word) mon | FAT_LOCK;
450: }
460:
470:
480: MonitorId obtain_monitor(Object* o) {
490:    Word word=o->lock;
500:    MonitorId mon;
510:    if (word & FAT_LOCK)
520:       mon = word &¯FAT_LOCK;
530:    else
540:       mon = lookup_monitor(o);
550:    return mon;
560: }
```

The contention bit introduced in the present invention is represented by flc_bit in table 4. The contents of table 4 will now be described in detail. Table 4 mainly consists of four portions: the lock function portion (line 10 to line 170), the unlock function portion (line 190 to line 380), the inflate function portion that represents the shift from a light-weight lock to a heavy-weight lock (line 410 to line 450), and the obtain_monitor function for acquiring the identifier of a monitor (line 480 to line 560).

(1) Lock Function

In the processing beginning at line 10 in the lock function for object o, first, acquisition of a light-weight lock is attempted (line 30). An atomic instruction, such as compare_and_swap, is employed for the acquisition of the light-weight lock. In response to this instruction, a third argument is stored in a lock field when the location specified by a first argument and a second argument have the same value. In this case, when the lock field o->lock of object o is equal to 0, a thread identifier is obtained by thread_id( ) and is stored in the lock field "o->lock". That is, the shift from state (1) to state (2) in FIG. 2 is performed. Then, program control returns to perform a necessary process (line 40). If the lock field "o->lock" for object o is not equal to 0, the acquisition of the light-weight lock fails and program control moves to line 60. The processing up to this point is the same as conventional processing.

A value from the obtain_monitor(o) function for obtaining a monitor identifier is substituted into variable "mon" (line 60), following which the thread is to be shifted to the exclusive state under the monitor. In other words, the thread is to enter the monitor (line 70). If the thread can be shifted to the exclusive state, the following processing is performed. If at that time the thread can-not enter the monitor, the thread waits until entry is permitted. Then, the condition of the "while" statement is checked. That is, each bit in the lock field "o->lock" and the FAT_LOCK bit is ANDed to determine whether the FAT_LOCK bit has been set (line 90). In this case whether the light-weight lock has been shifted to the heavy-weight lock or whether the light-weight lock is currently being executed is determined. If the FAT_LOCK bit has not been set (during the execution of the light-weight lock), the AND result is 0 and the processing following the "while" statement is performed. When the FAT_LOCK bit has been set (during the execution of the heavy-weight lock), the processing following the "while" statement is not performed and the thread remains in the monitor. If the thread entered the monitor while the FAT_LOCK bit was set, it is assumed in the present invention that the heavy-weight lock can be acquired. The thread thereafter performs the processing for the object without exiting the monitor, i.e., without exiting the exclusive state.

When in line 90 the FAT_LOCK bit is not set, it is assumed that a light-weight lock contention has occurred, and flc_bit is set (line 100, set_flc_bit(o)). In other words, the shift from state (2) to state (3) in FIG. 2 is performed. Then, it is checked whether the light-weight lock can be acquired again (line 110). When the light-weight lock can be acquired, the inflate function for shifting from a light-weight lock to a heavy-weight lock is performed (line 120). When a light-weight lock can not be acquired, program control shifts to the monitor waiting state (line 140). The monitor waiting state is the state where a thread exits the monitor and suspends, as was previously explained for the monitor. When a contention among the light-weight locks has occurred, contention bit flc_bit is set. When the light-weight lock can not be acquired, the thread enters the monitor waiting state. In this waiting state, the thread will later be notified (notify or notify_all) when the inflate function is being performed or when the object has been unlocked.

(2) Inflate Function

The processing of the inflate function lines 410 to 450 will now be described. First, a contention bit is cleared (line 420, clear_flc_bit), and then a monitor notification operation (monitor_notify_all) is performed (line 430). In this case, a notification is performed for all the threads in the waiting state to awaken them. Following this, each bit of the variable "mon", in which the monitor identifier is stored, and the FAT_LOCK bit are ORed, and the result is stored in the lock field "o->lock" (line 440, mon|FAT_LOCK). That is, state (3) in FIG. 2 is shifted to state (4). As a result, the shift from the light-weight lock to the heavy-weight lock is completed. When the process in line 120 has been performed, the condition of the "while" statement is again examined. However, since the FAT_LOCK bit has been set, the thread exits the "while" statement and remains in the monitor. In other words, the process in the body of the "while" statement is not performed.

Upon receiving the notification, at line 140 all the threads implicitly attempt to enter the monitor, but can not and must continue to wait. This occurs because the thread that performs "notify_all" does not exit from the monitor until after it has performed the unlocking process.

(3) Unlocking Function

The processing of the unlocking function lines 190 to 380 will now be described. The unlocking function handles the unlocking of both a light-weight lock and a heavy-weight lock. The unlocking of a heavy-weight lock means a shift from state (4) in FIG. 2 to state (1).

(3-1) Unlocking of Light-Weight Lock

To unlock a light-weight lock, first, each bit in the lock field "o->lock" and the FAT_LOCK bit are ANDed, and it is checked whether the result is 0 (line 210). This process is the same as the condition in the "while" statement in line 90 that is used to determine whether the light-weight lock is being executed. If the light-weight lock is being executed, a value of "0" is stored in the lock field o->lock (line 220). As a result, data is recorded that indicates no thread holds a lock. Then, whether a contention bit has been set is determined (line 230, test_flc_bit). Even when a light-weight lock contention has not occurred, at least the process in line 230 must be performed. Therefore, in this invention, the only overhead imposed by the frequently executed path is line 230. When a contention bit has not been set, the unlock processing is terminated, without any other process being performed (line 300).

When a contention bit has been set, the monitor identifier is stored in the variable mon, as in lines 60 and 70 (line 240), and a thread attempts to enter the corresponding monitor (line 250), i.e., a thread attempts to enter the exclusive state under the monitor. When the thread can enter the monitor, it determines again whether the contention bit has been set (line 260). If the contention bit has been set, while in the monitor the thread notifies one of the waiting threads to awaken it (line 270, monitor_notify(mon)). If at that time the notified thread can not enter the monitor, it waits until entry is possible, while the thread that performs "monitor_notify" exits from the exclusive state under the monitor (line 280, monitor_exit(mon)).

Upon receiving the notification as indicated in line 270, at line 140 the thread enters the monitor. Program control returns to line 80 to perform the process. Normally, the thread that is notified at line 270 enters the exclusive state under the monitor after the thread that performs "monitor_notify" has exited from the exclusive state. Then, the contention bit is set, a light-weight lock is acquired, and the inflate function is performed to shift to a heavy-weight lock.

(3-2) Unlocking of Heavy-Weight Lock

When it is ascertained at line 210 that the FAT_LOCK bit has been set, the processing is shifted to line 330, at which the contents in the lock field "o->lock" are stored in a variable x. Then, in the monitor it is checked whether any other waiting thread is present (line 340). If there are no waiting threads, whether a predetermined condition is satisfied is determined (line 350). In a condition where a thread should not exit, such a condition could be set as a predetermined condition. This step, however, can be omitted. If a predetermined condition is established, "0" is stored in the lock field "o->lock" (line 360). In other words, data asserting the absence of a thread that holds a lock is stored in the lock field. Then, the thread exits from the monitor having the identifier that is stored in a portion of the variable x apart from the FAT_LOCK bit (line 370). The expression "x & ⁻FAT_LOCK" indicates that the inverted FAT_LOCK bit and each bit in the variable x are ANDed. As a result, a thread that waits to enter the monitor can enter.

(4) The Obtain_Monitor Function for Acquiring a Monitor Identifier

In this function, first, the contents of the lock field "o->lock" are stored in variable "word" (line 490). Variable "mon" for storing a monitor identifier is prepared (line 500), and whether the FAT_LOCK bit is set is determined (line 510, word & FAT_LOCK). If the FAT_LOCK bit is set, a portion of the variable "word," except for the FAT_LOCK bit, is stored in variable "mon" (line 520, word & ⁻FAT_LOCK). If the FAT_LOCK bit is not set, the lookup_monitor(o) function is performed (line 530). While no explanation for this function was given referring to table 4, it is assumed that this function includes a hash table which maintains associations between objects and their monitors. Basically, the hash table is examined for object o, and the identifier of the monitor is returned. If necessary, a monitor is generated, and its association stored in the hash table and the identifier is returned. In any case, the monitor identifier stored in the variable mon is returned.

Great differences exist between Table 4 and the conventional art described in the "Background": a contention bit is introduced; no processing is done at lines 150 to 170; and a shift from a heavy-weight lock to a light-weight lock is attempted at lines 320 to 370. The determination at line 230 must be performed because of the introduction of a contention bit; however, if such a bit is not introduced, a greater penalty must be accepted, as in the conventional art. In addition, when the FAT_LOCK bit is set and when the thread can be shifted to the exclusive state under the monitor, it is assumed that a heavy-weight lock can be acquired. Therefore, a heavy-weight lock mechanism is not required in addition to the monitor, and the processing for exiting the exclusive state under the monitor and for acquiring the heavy-weight lock are removed, so that the processing speed can be increased. In addition, since a shift from a heavy-weight lock to a light-weight lock (from state (4) in FIG. 2 to state (1)) is performed, the state can be returned to that wherein a frequently executed path can be employed for a small load.

An explanation will now be given for the prevention of a problem that can occur because a contention bit is set at line 100 in table 4 and is examined at line 230. First, it is confirmed that "a contention bit is cleared only by the inflate function."

Assume that thread T enters the waiting state. That thread T will be notified will be explained for two cases.

(1) Case where the Inflate Function is Performed

When the inflate function is performed, a notify_all operation is initiated at line 430. That is, thread T is notified.

(2) Case where the Inflate Function is not Performed

The thread T enters the waiting state because it fails at line 110 to acquire a light-weight lock. Following the failure at line 110 implies that another thread, S, is currently holding a light-weight lock. In other words, thread S does not yet execute the unlocking function at line 220. In addition, while taking into account the non-execution of the inflate function, the contention bit is set by thread T before it enters the waiting state, so that due to the above matter that has been confirmed, the contention bit is maintained. Thread S then finally advances to line 220 for the unlocking function and examines the contention bit, for which success is ensured. In other words, thread T is notified from thread S.

Furthermore, in this invention a shift from state (4) in FIG. 2 to state (1) is introduced. This is safe processing for the following reasons: 1) the compare_and_swap at line 30 must be successful in order for a light-weight lock to be acquired, but if another thread has acquired a heavy-weight lock, the compare_and_swap is not successful, and therefore, it is ensured that a thread can not acquire a light-weight lock when a heavy-weight lock is being held by another thread; and 2) to acquire a heavy-weight lock a thread must enter a monitor and the condition of the "while" statement must not be established, but since the condition of the "while" statement is satisfied so long as another thread holds a light-weight lock, it is ensured that when a light-weight lock is held by another thread, even if a thread can enter the monitor it can not acquire a heavy-weight lock.

Advantages of the invention are as follows. According to the present invention, a new hybrid locking method can be provided whereby there is no deterioration of the processing speed along a frequently executed path. Furthermore, an object locking method can be provided whereby a heavy-weight lock and a monitor need not be separately prepared and "yield" is not employed, and whereby when a FAT_LOCK bit indicates a shift to a heavy-weight lock and a thread enters a monitor, it is assumed that a heavy-weight lock has been acquired. In the present invention a shift from a heavy-weight lock to a light-weight lock is enabled.

What is claimed is:

1. A method for managing a lock of an object by storing a bit representing a type of said lock, and an identifier of a thread having acquired a lock in accordance with a first type of lock or an identifier of a second type of lock into a storage area corresponding to said object, in a state where a plurality of threads exist, said method comprising the steps of:

if a first thread attempts to acquire a lock of an object that has been acquired by a second thread, determining whether said bit representing the type of the lock of said object represents said first type of lock; and if said bit represents said first type of lock, setting a contention bit.

2. The method according to claim 1, further comprising the steps of:

if said second thread unlocks said object, determining whether said bit representing the type of the lock represents said first type of lock;

if said bit represents said first type of lock, storing in said storage area, data that no thread holds said lock of said object;

determining whether said contention bit has been set; and if said contention bit has not been set, terminating unlocking processing and performing no further processing.

3. The method according to claim 2, further comprising the steps of:

if said contention bit has been set, shifting said second thread into an exclusive state of a mechanism for providing an exclusion of an access to an object and a wait-operation of a thread and a notify-operation to a waiting thread in a case where a predetermined condition is satisfied;

performing said notify-operation to said waiting thread; and removing said first thread from said exclusive state.

4. The method according to claim 1, wherein said first type of lock is a locking method for managing a lock state by storing for an object, an identifier of a thread which holds a lock so as to correspond to said object.

5. The method according to claim 1, wherein said second type of lock is a locking method for employing a queue to manage a thread that accesses to an object.

6. A method for managing a lock of an object by storing a bit representing a type of said lock, and an identifier of a thread having acquired a lock in accordance with a first type of lock or an identifier of a second type of lock into a storage area corresponding to said object, in a state where a plurality of threads exist, said second type of lock being a locking method for employing a queue to manage a thread that accesses to an object, said method comprising the steps of:

shifting said second thread into an exclusive state of a mechanism for providing an exclusion of an access to an object and a wait-operation of a thread and a notify-operation to a waiting thread in a case where a predetermined condition is satisfied;

determining whether said bit representing the type of the lock of a certain object represents said first type of lock;

if said bit represents said first type of lock, determining whether said first thread can acquire said first type of lock; and if said first thread can acquire said first type of lock, storing in a storage area corresponding to said certain object, the bit representing said second type of lock and the identifier of said second type of lock; and wherein said first thread exits from said exclusive state upon the completion of operations required for said certain object.

7. The method according to claim 6, further comprising a step of shifting to a wait state of said mechanism if said first thread can not acquire said first type of lock.

8. The method according to claim 6, further comprising a step of, if said bit representing the type of the lock of said certain object does not represent said first type of lock, assuming that said first thread has acquired said second type of lock and performing processing without exiting from said exclusive state.

9. A method for managing a lock of an object by storing a bit representing a type of said lock, and an identifier of a thread having acquired a lock in accordance with a first type of lock or an identifier of a second type of lock into a storage area corresponding to said object, in a state where a plurality of threads exist, said second type of lock being a locking method for employing a queue to manage a thread that accesses to an object, said method comprising the steps of:

shifting a first thread to an exclusive state of a mechanism for providing an exclusion of an access to an object and a wait-operation of a thread and a notify-operation to a waiting thread in a case where a predetermined condition is satisfied;

determining whether the bit representing the type of said lock of a certain object represents said second type of lock; and if said bit represents said second type of lock, assuming that said first thread has acquired said second type of lock and performing processing without exiting from said exclusive state.

10. An apparatus for managing a lock of an object in a computer system concurrently executing a plurality of threads, comprising:

means for associating a type identifier, a thread identifier, and a contention bit with said lock of an object;

means for granting said lock of an object to a requesting thread in accordance with a first lock grant procedure if said lock has not been acquired by another thread;

means for determining said type identifier associated with said lock, responsive to a request by a first thread to acquire said lock, if a second thread has acquired said lock;

means, responsive to said means for determining said type identifier, for (a) setting said contention bit if said type identifier is a first type of lock, and (b) granting said lock of an object to said first thread in accordance with a second lock grant procedure if said type identifier is a second type of lock.

11. The apparatus for managing a lock of an object of claim 10, further comprising:

means for determining the state of said contention bit upon release of said lock by said second thread;

means for executing a shift procedure for shifting the type of said lock, responsive to determining that said contention bit has been set.

12. A storage medium for storing a program for causing a computer to manage a lock of an object by storing a bit representing a type of said lock, and an identifier of a thread having acquired a lock in accordance with a first type of lock or an identifier of a second type of lock into a storage area corresponding to said object, in a state where a plurality of threads exist, said program comprising the steps of:

if a first thread attempts to acquire a lock of an object that has been acquired by a second thread, determining whether said bit representing the type of the lock of said object represents said first type of lock; and if said bit represents said first type of lock, setting a contention bit.

13. A storage medium for storing a program for causing a computer to manage a lock of an object by storing a bit representing a type of said lock, and an identifier of a thread having acquired a lock in accordance with a first type of lock or an identifier of a second type of lock into a storage area corresponding to said object, in a state where a plurality of threads exist, said second type of lock being a locking method for employing a queue to manage a thread that accesses to an object, said program comprising the steps of:

shifting said second thread into an exclusive state of a mechanism for providing an exclusion of an access to an object and a wait-operation of a thread and a notify-operation to a waiting thread in a case where a predetermined condition is satisfied;

determining whether said bit representing the type of the lock of a certain object represents said first type of lock;

if said bit represents said first type of lock, determining whether said first thread can acquire said first type of lock; and if said first thread can acquire said first type of lock, storing in a storage area corresponding to said certain object, the bit representing said second type of lock and the identifier of said second type of lock; and wherein said first thread exits from said exclusive state upon the completion of operations required for said certain object.

14. A storage medium for storing a program for causing a computer to manage a lock of an object by storing a bit representing a type of said lock, and an identifier of a thread having acquired a lock in accordance with a first type of lock or an identifier of a second type of lock into a storage area corresponding to said object, in a state where a plurality of threads exist, said second type of lock being a locking method for employing a queue to manage a thread that accesses to an object, said program comprising the steps of:

shifting a first thread to an exclusive state of a mechanism for providing an exclusion of an access to an object and a wait-operation of a thread and a notify-operation to a waiting thread in a case where a predetermined condition is satisfied;

determining whether the bit representing the type of said lock of a certain object represents said second type of lock; and if said bit represents said second type of lock, assuming that said first thread has acquired said second type of lock and performing processing without exiting from said exclusive state.

\* \* \* \* \*